(12) United States Patent
Côté et al.

(10) Patent No.: US 11,057,278 B1
(45) Date of Patent: Jul. 6, 2021

(54) DISCOVERY OF PORT-TO-PORT CONNECTIVITY ACROSS NETWORK LAYERS USING MACHINE LEARNING

(71) Applicant: Ciena Corporation, Hanover, MD (US)

(72) Inventors: David Côté, Ottawa (CA); Minming Ni, Ottawa (CA); Phillip Doelling, Lucas, TX (US); Mark Gibson, Bristol (GB); Cengiz Alaettinoglu, Sherman Oaks, CA (US); William Kaufmann, Chicago, IL (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/895,041

(22) Filed: Jun. 8, 2020

(51) Int. Cl.
  *H04L 12/24* (2006.01)
(52) U.S. Cl.
  CPC .............. *H04L 41/12* (2013.01); *H04L 41/16* (2013.01)
(58) Field of Classification Search
  CPC .................................. H04L 41/12; H04L 41/16
  See application file for complete search history.

(56) References Cited

U.S. PATENT DOCUMENTS

| | | | |
|---|---|---|---|
| 7,120,792 B1 | 10/2006 | Jacobson et al. | |
| 7,197,573 B1 | 3/2007 | Jacobson et al. | |
| 7,539,191 B1 | 5/2009 | Jacobson et al. | |
| 8,135,834 B1 | 3/2012 | Jacobson et al. | |
| 8,274,901 B1 | 9/2012 | Casner et al. | |
| 8,422,502 B1 | 4/2013 | Alaettinoglu et al. | |
| 8,937,946 B1 | 1/2015 | Kenna et al. | |
| 9,197,565 B2 | 11/2015 | Khanchi et al. | |
| 9,924,392 B2 | 3/2018 | Côté et al. | |
| 10,171,161 B1 | 1/2019 | Côté et al. | |
| 10,623,277 B2 | 4/2020 | Djukic et al. | |
| 2002/0188936 A1 | 12/2002 | Bojanic et al. | |
| 2014/0092204 A1 | 4/2014 | Javadtalab et al. | |
| 2014/0369238 A1 | 12/2014 | Alaettinoglu et al. | |
| 2015/0271034 A1 | 9/2015 | Kanna et al. | |
| 2016/0057049 A1 | 2/2016 | Jacobson et al. | |
| 2017/0302505 A1* | 10/2017 | Zafer | H04L 69/40 |
| 2018/0220210 A1* | 8/2018 | Paraschis | H04Q 11/0066 |
| 2018/0248771 A1 | 8/2018 | Côté et al. | |
| 2018/0248905 A1 | 8/2018 | Côté et al. | |
| 2019/0138948 A1 | 5/2019 | Janulewicz et al. | |
| 2019/0230046 A1 | 7/2019 | Djukic et al. | |
| 2019/0280942 A1 | 9/2019 | Côté et al. | |
| 2019/0303726 A1 | 10/2019 | Côté et al. | |
| 2020/0082013 A1 | 3/2020 | Triplet et al. | |

OTHER PUBLICATIONS

Jaumard et al., Topology Discovery of Synchronous Optical Networks, 2017, pp. 1-7.

* cited by examiner

*Primary Examiner* — Adnan M Mirza
(74) *Attorney, Agent, or Firm* — Clements Bernard Walker; Lawrence A. Baratta, Jr.; Christopher L. Bernard

(57) ABSTRACT

Systems and methods for discovering the connectivity topology of cross-layer links in a multi-layer network are provided. In one implementation, a method includes a step of obtaining input data related to a plurality of Network Elements (NEs) operating in a plurality of layers within a multi-layer network having one or more cross-layer port-to-port connectivity links therebetween. The method also includes the step of utilizing Machine Learning (ML) processes and the input data to discover the one or more cross-layer port-to-port connectivity links between pairs of NEs operating in different layers of the plurality of layers within the network.

20 Claims, 5 Drawing Sheets

DISCOVERY OF PORT-TO-PORT CONNECTIVITY ACROSS NETWORK LAYERS USING MACHINE LEARNING

TECHNICAL FIELD

The present disclosure generally relates to networking systems and methods. More particularly, the present disclosure relates to discovering cross-layer connectivity links, such as by using machine learning.

BACKGROUND

Generally, a network (e.g., communications network) may be configured to operate over a number of layers. For example, the network may include an Internet Protocol (IP) layer and a lower layer (e.g., an optical layer), among other layers. In an IP-over-optical network, a port of a Network Element (NE) on the IP layer may appear to be directly connected to a port of another NE on that same IP layer, but in actuality the IP ports may be connected via a number of optical NEs in the optical layer. The connectivity between the two different layers may be referred to as "cross-layer stitching." From the point of view of the network protocol operating on the IP layer, the intermediate optical ports may be invisible. Likewise, the IP ports may appear to be invisible to the network protocol operating on the optical layer.

In principle, the cross-layer links can be tracked and information of these cross-layer links can be stored in an inventory database of a Network Management System (NMS). However, it is not always possible to access such an inventory, and experience shows that inventory information often includes mistakes. Normally, the cross-layer port-to-port topology information is created manually in the inventory database. When modifications are made in the network, the inventory database can be manually updated. Although some systems may be able to assist a user (e.g., network operator) while performing these manual tasks, there are currently no automatic solutions available.

Another shortcoming with conventional systems is that the processes of manually editing the cross-layer topology may potentially introduce mistakes and may even contain omissions. Typically, when there are discrepancies between the inventory database and the actual topology, it usually will not take a long time to find out that the stored topology information does not match the topology in the real network. Also, in some cases, the cross-layer topology of a network may be completely unknown, even though some network operations might still need to rely on this topology information for making network deployment decisions. Therefore, there is a need in the field of networks to provide solutions for multi-layer networks to overcome the various shortcomings of conventional systems.

BRIEF SUMMARY

The present disclosure is directed to systems and methods for discovering the connectivity topology of a multi-layer network. According to one embodiment, a Network Management System (NMS) comprises a processing device and a memory device having instructions, which, when executed, cause the processing device to obtain input data related to a plurality of Network Elements (NEs) operating in a plurality of layers within a network having one or more cross-layer port-to-port connectivity links therebetween (e.g., a multi-layer network). The instructions further cause the processing device to utilize Machine Learning (ML) processes and the input data to discover the one or more cross-layer port-to-port connectivity links between pairs of NEs operating on different layers of the plurality of layers within the network.

According to another embodiment, a non-transitory computer-readable medium may be configured to store computer logic having instructions that, when executed, cause one or more processing devices to perform certain actions. For example, the one or more processing devices may be configured to obtain input data related to a plurality of Network Elements (NEs) operating in a plurality of layers within a network having one or more cross-layer port-to-port connectivity links therebetween. The one or more processing devices may also utilize Machine Learning (ML) processes and the input data to discover the one or more cross-layer port-to-port connectivity links between pairs of NEs operating in different layers of the plurality of layers within the network.

According to yet another embodiment, the present disclosure provides a method including the step of obtaining input data related to a plurality of Network Elements (NEs) operating in a plurality of layers within a network having one or more cross-layer port-to-port connectivity links therebetween. The method also includes utilizing Machine Learning (ML) processes and the input data to discover the one or more cross-layer port-to-port connectivity links between pairs of NEs operating in different layers of the plurality of layer within the network.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
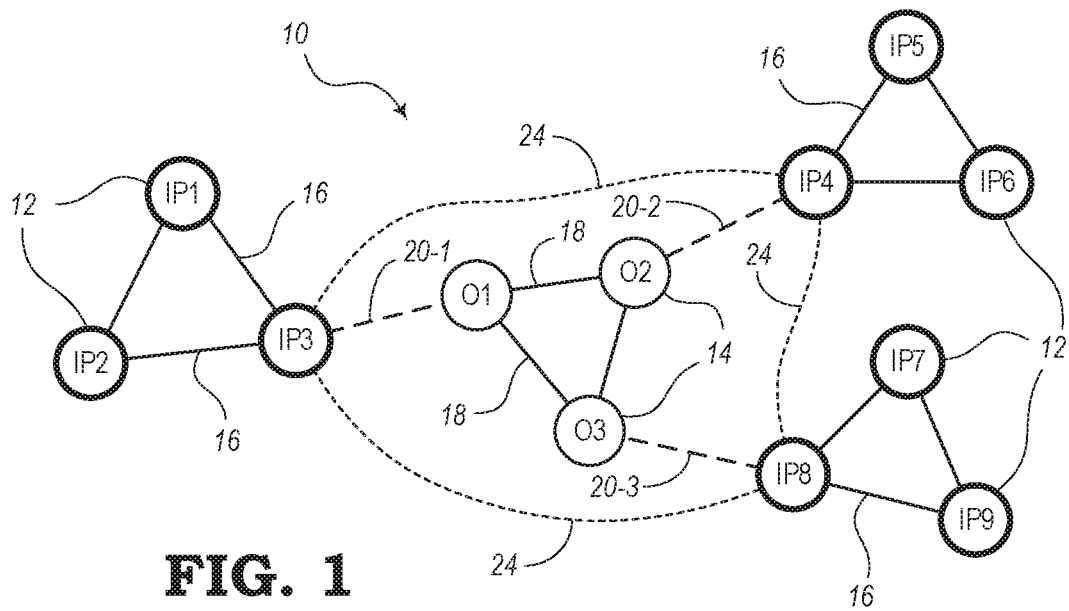
FIG. 1 is a diagram illustrating a portion of a multi-layer network, according to various embodiments.

The present disclosure relates to networking systems where Network Elements (NEs) operating in multiple layers of a network (e.g., packet network, optical network, telecommunication network, or other suitable type of network) are configured to communicate with each other. The network itself may be referred to as a multi-layer network. The cross-layer communication can be analyzed to determine the connectivity links therebetween. The process of finding this connectivity may be referred to as "cross-layer stitching." The present disclosure describes various systems and methods for discovering the cross-layer connectivity topology of at least part of the network and particularly discovering the cross-layer connection links between pairs of NEs on different layers. This discovery process can be automated, according to some embodiments of the present disclosure, using Machine Learning (ML) techniques.

Presently, there are solutions for NEs (e.g., switches, routers, etc.) to discover their neighbors, which is relatively easy when this is done on one layer. Devices known as "network crawlers" may be used to discover same layer connectivity. However, when link connectivity extends across multiple layers, typical network crawlers are unable to determine this cross-layer link topology. The present disclosure is configured to provide a solution to discovering connectivity in a Cross-Layer Stitching (CLS) architecture, particularly stitching between an Internet Protocol (IP) network and an optical network. These discovery solutions may be implemented in software, which may be run on a computer within a Network Management System (NMS). In some cases, the discovery software may be incorporated or packaged with other management software programs, such as software configured for inventory management, assurance/analytics, route origin authorization, network health prediction, etc. The data-driven cross-layer stitching applications described herein may include stitching-discover algorithms that can run in the background without interfering with IP processes.

The ML-based CLS systems and methods of the present disclosure rely on Performance Metrics (PMs) from the NEs on the various layers by actively collecting the PMs over time. Past PM data can be used for training and testing a ML model and the ML model can utilize current PM data to discover, determine, or reveal port-to-port links across two different layers (i.e., cross-layer links). The results of the discovery can be used to create a new inventory for defining the topology of the multi-layer network and/or can be used to verify the accuracy of an existing inventory or update/modify the existing inventory as needed based on newly discovered data. By using ML, the data-driven port-to-port cross-layer topology identification systems and methods of the present disclosure do not need constant human interaction, which can reduce the cost to maintain a network.

Thus, the present disclosure is directed to ML-based Cross-Layer Stitching (CLS) systems and methods for revealing port-to-port connectivity between different layers in networks. In particular, the systems and methods may be directed to discover or revealing cross-layer connectivity topology of a cross-layer stitched network, particularly discovering links between IP and optical networks operating under the Ethernet protocol, but, according to other embodiments, may also be applied to other types of network technologies.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Multi-Layer Network

FIG. 1 is a diagram illustrating an example of a portion of a multi-layer network 10. Particularly, the multi-layer network 10 in this example is an IP-over-optical network. In this embodiment, the multi-layer network 10 includes IP-layer devices 12 (labeled IP1, IP2, . . . IP9) and optical-layer devices 14 (labeled O1, O2, and O3). The IP-layer devices 12 and optical-layer devices 14 may be configured as Network Elements (NEs), such as routers, switches, etc. The IP-layer devices 12 communicate with each other via intra-layer links 16 and the optical-layer devices 14 communicate with each other via intra-layer links 18. In addition, the network 10 includes inter-layer or cross-layer links 20. For example, cross-layer link 20-1 connects IP-layer device IP3 with optical-layer device O1; cross-layer link 20-2 connects IP-layer device IP4 with optical-layer device O2; cross-layer link 20-3 connects IP-layer device IP8 with optical-layer device O3.

At the IP layer, for example, the IP-layer device IP3 appears to have direct connections to IP4 and IP8 (as depicted by dashed lines). However, the network 10 is actually configured such that these IP-layer devices use the optical network, which underlays the IP layer. In parallel, optical-layer devices 14 are not explicitly aware of the IP network that overlays the optical layer. Hence, the cross-layer links 20-1, 20-2, and 20-3 in this example are effectively invisible to both IP and optical protocols.

In principle, these cross-layer links 20-1, 20-2, 20-3 can be tracked by a Network Management System (NMS) and stored in an inventory database. However, it is not always possible in conventional systems to access such an inventory. Also, it has been observed that inventory information in conventional systems often includes mistakes. Therefore, one of the goals of the present disclosure is to provide an accurate way to discover the cross-layer links (e.g., 20-1, 20-2, 20-3). Some discovery methods of the present disclosure may include ML techniques, such as a process for matching patterns in the data (i.e., data-pattern matching). Connections discovered using the various techniques described herein can then be used to populate new inventory databases or verify the accuracy of existing inventory databases.

In FIG. 1, the IP-layer device IP3 (e.g., representing a node in Chicago) may be connected to the IP-layer device IP4 (e.g., representing a node in New York). While operating in the IP layer, these two IP-layer devices 12 may think they are neighbors operating next to each other, but in actuality they communicate through the optical network (i.e., O1, O2, O3). Although there is logical activity between IP3 and IP4, one of the purposes of the present disclosure is to discover the physical connectivity on all layers of the multi-layer network 10. The discovery of these links should not be influenced by looking at an existing inventory database, which may depend on a human operator manually entering the topology information into a database. Instead, the present disclosure provides systems and methods to discover the intra-layer and inter-layer connectivity using performance data, metrics, alarms, etc.

In the network 10, Ethernet data may be encoded into lower layer optical frames. The ports of the IP-layer devices 12 may communicate with ports of the optical-layer devices 14 using cross-layer handshaking processes. This allows both sets of devices 12, 14 to see input frames and output frames that are dropped or discarded. By analyzing the transmitting and receiving operations, the systems of the present disclosure may be able to determine that what one port transmit is approximately equal to what another port receives, even if the receiving port in on a different layer. If the traffic goes up at one port, the traffic should also go up on a neighboring port at approximately the same time. Thus, the discovery systems and methods of the present disclosure are able to recognize a strong correlation between transmission and reception of traffic and traffic patterns. However, in practice, this discovery process is not as simple as comparing the number of packets transmitted at one port with the number of packets received at another port to see if they are equal and then determining that the two points are connected because the numbers are the same. Instead, the processes described throughout the present disclosure may be utilized to accurately discover cross-layer connectivity for the entire topology of the network or at least a portion of the topology.

Figure 2:
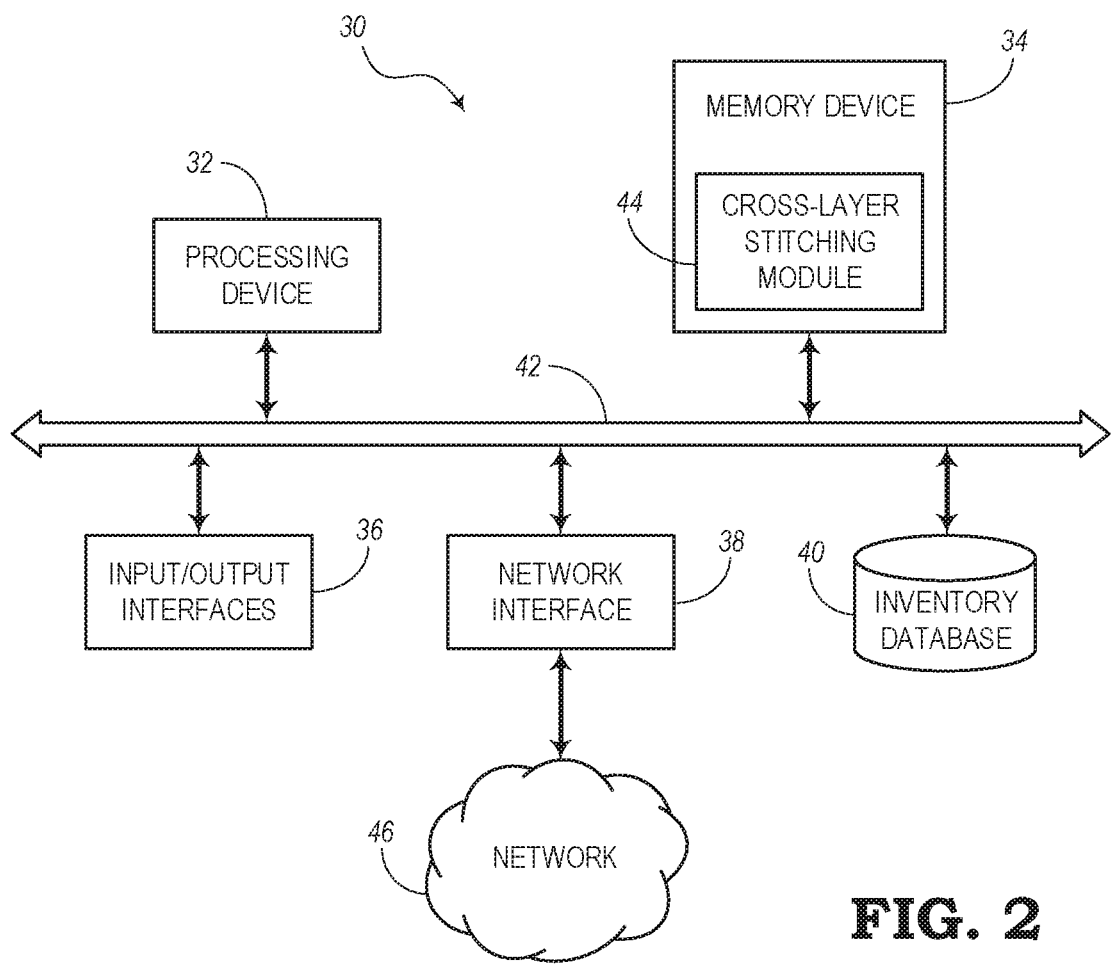
FIG. 2 is a block diagram illustrating a Network Management System (NMS), according to various embodiments.

FIG. 2 is a block diagram illustrating an embodiment of a Network Management System (NMS) 30, which may be configured for managing network activities in a network, such the network 10 of FIG. 1. In the illustrated embodiment, the NMS 30 may be a digital computer that, in terms of hardware architecture, generally includes a processing device 32, a memory device 34, Input/Output (I/O) interfaces 36, a network interface 38, and an inventory database 40. The memory device 34 may include a data store, database (e.g., inventory database 40), or the like. It should be appreciated by those of ordinary skill in the art that FIG. 2 depicts the NMS 30 in a simplified manner, where practical embodiments may include additional components and suitably configured processing logic to support known or conventional operating features that are not described in detail herein. The components (i.e., 32, 34, 36, 38, 40) are communicatively coupled via a local interface 42. The local interface 42 may be, for example, but not limited to, one or more buses or other wired or wireless connections. The local interface 42 may have additional elements, which are omitted for simplicity, such as controllers, buffers, caches, drivers, repeaters, receivers, among other elements, to enable communications. Further, the local interface 42 may include address, control, and/or data connections to enable appropriate communications among the components 32, 34, 36, 38, 40.

The processing device 32 is a hardware device adapted for at least executing software instructions. The processing device 32 may be any custom made or commercially available processor, a Central Processing Unit (CPU), an auxiliary processor among several processors associated with the NMS 30, a semiconductor-based microprocessor (in the form of a microchip or chip set), or generally any device for executing software instructions. When the NMS 30 is in operation, the processing device 32 may be configured to execute software stored within the memory device 34, to communicate data to and from the memory device 34, and to generally control operations of the NMS 30 pursuant to the software instructions.

It will be appreciated that some embodiments of the processing device 32 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 32 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 36 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 36 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 38 may be used to enable the NMS 30 to communicate over a network, such as the network 46 (or network 10), the Internet, a Wide Area Network (WAN), a Local Area Network (LAN), and the like. The network interface 38 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 38 may include address, control, and/or data connections to enable appropriate communications on the network 46.

The memory device 34 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 34 may incorporate electronic, magnetic, optical, and/or other types of storage media. The memory device 34 may have a distributed architecture, where various components are situated remotely from one another, but can be accessed by the processing device 32. The software in memory device 34 may include one or more software programs, each of which may include an ordered listing of executable instructions for implementing logical functions. The software in the memory device 34 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 34 may include a data store used to store data. In one example, the data store may be located internal to the NMS 30 and may include, for example, an internal hard drive connected to the local interface 42 in the NMS 30. Additionally, in another embodiment, the data store may be located external to the NMS 30 and may include, for example, an external hard drive connected to the Input/Output (I/O) interfaces 36 (e.g., SCSI or USB connection). In a further embodiment, the data store may be connected to the NMS 30 through a network and may include, for example, a network attached file server.

Moreover, some embodiments may include a non-transitory computer-readable storage medium having computer readable code stored in the memory device 34 for programming the or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 32 that, in response to such execution, cause the processing device 32 to perform a set of operations, steps, methods, processes, algorithms, functions, techniques, etc. as described herein for the various embodiments.

In the embodiment of FIG. 2, a Cross-Layer Stitching (CLS) module 44 may be configured in software or firmware within the memory device 34 and/or may be configured, at least partially, in hardware within the processing device 32. The CLS module 44 enables the processing device 32 to perform discovery processes for discovering, determining, or revealing connectivity, links, communication paths, etc. between NEs, nodes, ports, etc. The connectivity may include connections within a layer (i.e., intra-layer connectivity) of a network (e.g., network 46) or across two different layers (i.e., inter-layer connectivity) of the network.

In addition to establishing the cross-layer stitching between devices and discovering the device and connectivity architecture of the network, the CLS module 44 may also be configured to supply the discovered topology information in the inventory database 40. This may be a new inventory entry if one does not already exist in the inventory database 40. Otherwise, if an inventory already existing the inventory database 40, the cross-layer stitching module 44 may further be configured to update the inventory if it is determined that the existing inventory is inaccurate. The CLS module 44 can also determine the accuracy of the existing inventory and make modifications based on newly determined connectivity information.

The CLS module 44 is configured to utilize multi-variate time-series data obtained from the network 46 to train a ML model and test the model. The ML model is trained by recognizing data patterns among the various nodes/ports and matching nodes/ports with similar results to determine the likelihood or probability that the two matching nodes/ports are indeed connected. This data-pattern matching process may be one part of the ML training.

According to some embodiments, the CLS module 44 is configured to receive input data (as described below), format (pre-process or re-structure) the input data, and analyze the input data within a ML framework. Once trained, the ML model can be used in an ongoing process, operating in the background of the regular operations of the network 46, to continually update the connectivity information based on continuous training and re-training of the ML model and based on newly obtained input data.

Figure 3:
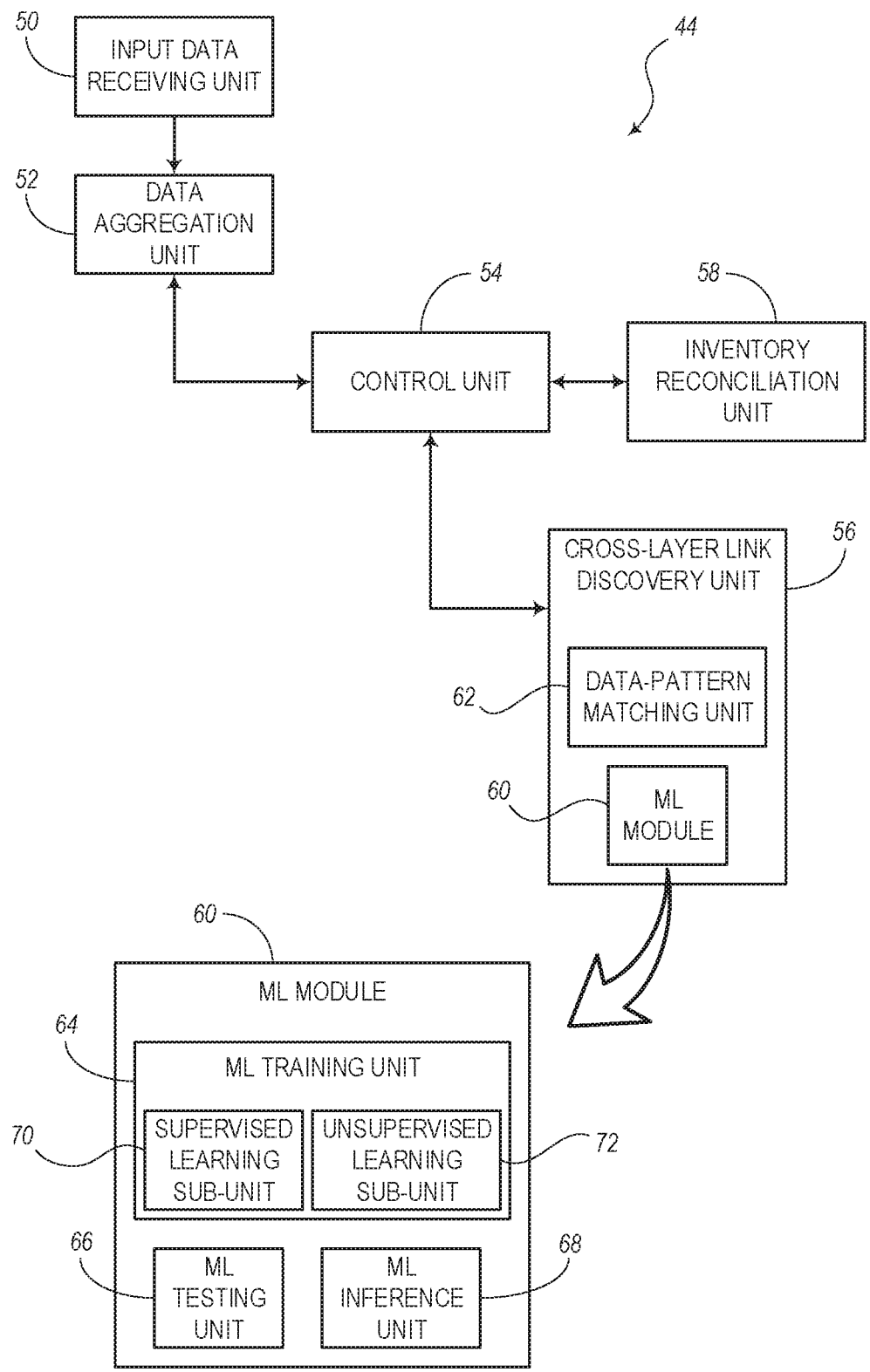
FIG. 3 is a block diagram illustrating features and modules of a cross-layer stitching module shown in FIG. 2, according to various embodiments.

FIG. 3 is a block diagram illustrating an embodiment of the CLS module 44 shown in FIG. 2. According to various embodiments, the CLS module 44 includes one or more of an input data receiving unit 50, a data aggregation unit 52, a control unit 54, a cross-layer link discovery unit 56, and an inventory reconciliation unit 58. The control unit 54 may be configured to organize the processes and functions to coordinate the various functions of the other modules and units of the CLS module 44. As shown, the cross-layer link discovery unit 56 may include an ML module 60 and a data-pattern matching unit 62. Furthermore, the ML module 60 may include an ML training unit 64, an ML testing unit 66 for testing the ML model using data from a lab environment, and a ML inference unit 68. The ML training unit 64 may include both a supervised learning sub-unit 70 and an unsupervised learning sub-unit 72.

Input Data

The input data receiving unit 50 is configured to receive input data from Network Elements (NEs) or nodes within a cross-layer stitched network (e.g., network 10, 46). There are two types of input data that may be received: 1) features used for model inference and 2) labels used for model training and testing.

Features

For the CLS method to be used in a general multi-vendor network, the expected inputs can be common PMs monitored by different NEs. For example, for a packet-optical platform, available Ethernet PMs may include:

E-CV: Ethernet Code Violation
E-DFR: Ethernet Discarded Frames
E-ES: Ethernet Error Second
E-FCSERR: Ethernet Frame Check Sequence Error
E-INFRAMES: Ethernet In Frames
E-INFRAMESERR: Ethernet In Errored Frames
E-OUTFRAMES: Ethernet Out Frames
E-OUTFRAMESERR: Ethernet Out Errored Frames
E-SESDFR: Ethernet Severely Errored Seconds on Discarded Frames
E-UAS: Ethernet Unavailable Seconds.

Similarly, for IP routers, related interface PMs may include:

ifOperStatus: Interface Operation Status
ifOutOctets: Total number of octets transmitted out of the interface
ifInErrors: Interface Inbound Errors
ifOutErrors: Interface Outbound Errors
ifInDiscards: Interface Inbound Discards
ifOutDiscards: Interface Outbound Discards
ifHCInBroadcastPkts: The number of packets, delivered by this sub-layer to a higher layer, which were addressed to a broadcast address at this sub-layer.
ifHCInMulticastPkts: The number of packets, delivered by this sub-layer to a higher layer, which were addressed to a multicast address at this sub-layer.

ifHCInUcastPkts: The number of packets, delivered by this sub-layer to a higher layer, which were addressed to a unicast address at this sub-layer ifInputQueueDrops: Interface Input Queue Drop Packets ifOutQueueDrops: Interface Output Queue Drop Packets The CLS module 44 can also utilize additional metrics, which are either strongly or weakly correlated with network topology, including:

Alarms raised in pairs from neighboring ports

State changes observed in pairs from neighboring ports

Routing tables

"trunk port" carrying several vLANs

IP latency (as an optional metric to identify whether traffic going through optical)

ARP: cache of IPs and MAC addresses

Names of nodes, interfaces, and loopback address. Similarity of names suggest ports at the same physical location.

Imperfect inventory information (usable via string similarity matching).

The input data receiving unit 50 of the CLS module 44 receives these and/or other types of data from the network. It is also possible for the CLS module 44 to generate specific alarms for CLS at suspected paired ports by rebooting interfaces, when the input data receiving unit 50 does not observe any traffic on the monitored ports or during maintenance windows.

The input data receiving unit 50 can take all performance metrics, alarms, events, state changes, or other relevant data by actively querying or passively receiving from the related NEs. The data can be obtained as raw input, which can be used by the CLS module 44 to determine the port-to-port connectivity in the observed network. Due to the multi-vendor variations and also the potential usage of legacy equipment in the network, the data aggregation unit 52 is configured to perform various types of re-structuring, pre-processing, etc. to create an integrated input data frame for topology identification.

The data aggregation unit 52 may be configured to take the multiple types of inputs and mix them in certain ways for processing by the ML module 60, which may use the supervised learning sub-unit 70 for supervised machine learning. Even if there is no traffic, it is still possible for the CLS module 44 to perform discovery processes. If two ports are connected along a path having several hops, ML training unit 64 may be configured to determine that the same traffic goes through all the nodes along this path. The traffic patterns at one port will show similar traffic patterns of another port. The cross-layer link discovery unit 56 may be configured to determine this correlation of traffic patterns.

In some embodiments, the CLS module 44 may be configured to provide a report to a downstream dependent that a node/port is in an error state. The dependent may acknowledge receipt of the report. These signals may be analyzed to determine a connectivity pairing. Also, if alarms are raised at the same time, analysis of alarms may be used by the cross-layer link discovery unit 56 that the connection pair is probable. These and other metrics (even including some metrics that are not often utilized, as mentioned above) can be used by the cross-layer link discovery unit 56 to extract information about connectivity. With supervised learning, the ML framework of the supervised learning sub-unit 70 is able to extract information. The ML module 60 may be configured to perform discovery functions with little input data. If there is no data available, the ML process may simply rely on previously obtained data. The ML module 60 may also be configured to provide weights to the input data based on how much data can be obtained, whereby very little data might be given a lower weight or no weight.

Labels

Labeled data may be used for testing an ML algorithm. Labeled data is also used for training if using supervised ML sub-unit 70, but may not be needed with unsupervised ML by the unsupervised learning sub-unit 72.

In this case, the labels provide the true stitching information from the inventory database 40 or other inventory system of a controlled environment (e.g., network 46), where the information may be verified as being correct. The labels can come from a lab, a reference production network, and/or from a subset of the target network 46 (e.g., network 10). The subset can be either a small fraction of the network elements and/or a limited time period where the inventory is known to be correct. The utilization of labels is described below.

Data Formatting/Pre-Processing

Data Aggregation

Figure 4:
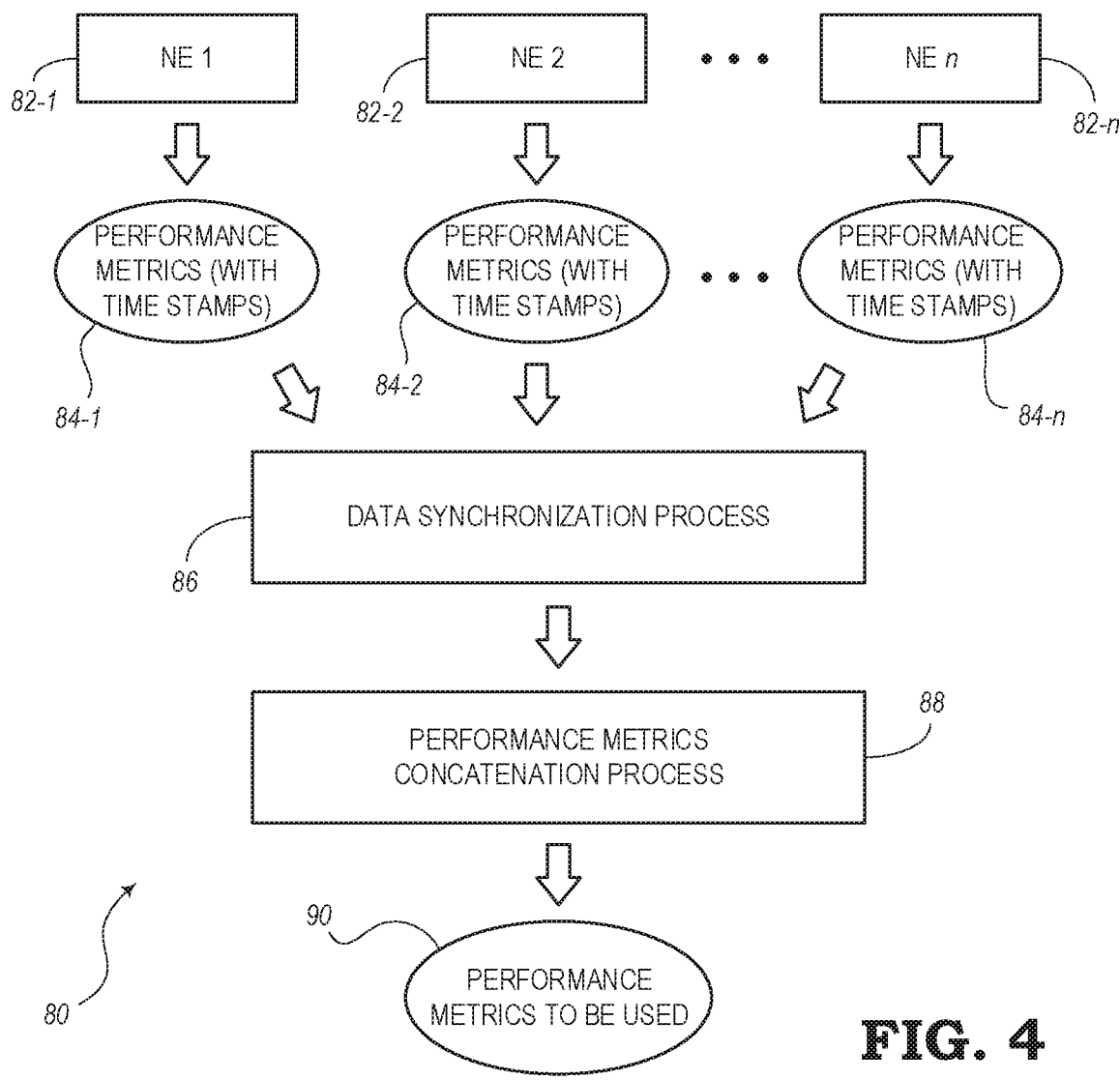
FIG. 4 is a flow diagram illustrating a data aggregation process, according to various embodiments.

FIG. 4 is a flow diagram illustrating an embodiment of a data aggregation procedure 80 for aggregating PM data obtained from different NEs 82-1, 82-2, . . . , 82-n, which may represent NEs manufactured by different vendors. According to this embodiment, the process 80 includes obtaining performance metrics 84-1, 84-2, . . . , 84-n from the NEs 82. The PM data is recorded along with time stamps or other time information for creating a time-series. For example, at each point in time, the first NE 82-1 may be configured to obtain m PMs: $PM_1, PM_2, \ldots, PM_m$, the second NE 82-2 may be configured to obtain m' PMs: $PM_1, PM_2, \ldots, PM_{m'}$, and the nth NE 82-n may be configured to obtain m" PMs: $PM_1, PM_2, \ldots, PM_{m''}$. Generally, the observed network (e.g., network 46) is constructed by n NEs 82. Due to different internal protocols, the NEs 82 from different vendors may use a different number of PMs to depict a similar port performance. For example, NEs 82-1, 82-2, and 82-n provides m, m', and m" PMs in each batch, respectively.

The procedure 80 may include normalization, where the network could have equipment from different vendors. The data collection process of the NEs 82 may include a two-step process for collecting PM data from different input elements: 1) Collect raw data from every NE. Then, 2) if the datasets are from different vendors, different time zones, different frequencies, or have other types of differences, the procedure 80 may include an optimization process to put the datasets back to a common schema. Sometimes this can be performed by a resource adaptor. This may be part of a data acquisition process for collecting data from different sources, which may inherently have different schemas. For the purpose of the ML applications as described herein, the procedure 80 may be configured to normalize the datasets to a common schema.

The data acquisition step may be an active step, whereby the CLS module 44 is configured to communicate directly with the devices of the network 46. Some acquisition techniques may utilize different kinds of devices for pulling PM data from the devices. However, the reporting time might not accurately indicate the time when the PM data is actually obtained, which is why the data synchronization process 86 may be used, which may be based on any suitable type of calibration or other factors. By synchronization, the CLS module 44 can ensure that one dataset describing the network is matched up with other data describing other events, situations, states, etc. at the same time for all devices. This formatting or pre-processing procedure 80 can be part of a normal data acquisition process and prepares the data in order that the data can be properly handled before fitting data to the ML model.

The data aggregation procedure 80 includes combining the PM datasets from the n different NEs and using a data synchronization process 86. Then, the PMs can be concatenated by a performance metrics concatenation process 88, which provides the PMs that can be used in the CLS module 44 in ML procedures, cross-layer link discover procedures, data-pattern matching procedures, etc. Once concatenated, the procedure 80 creates the PM data 90, as shown at the bottom of FIG. 4, which can be used in the ML techniques. The PM data 90 to be used may include multi-variate time-series datasets.

For some NEs, if the observations of PMs are obtained at the same time, they can be directly concatenated. However, it may be more common that observations might be acquired with a time difference $\Delta t$. In this case, the data synchronization process 86 may be used. This operation may normally be vendor-specified and can be supported by a synchronization plugin library associated with the data aggregation procedure 80.

After any necessary data synchronization by the data synchronization process 86, the performance metrics can be concatenated in the performance metrics concatenation process 88 for each time stamp. It should be noted that, due to the data synchronization process 86, the original metrics obtained from NE 82-*n*: $\{PM1(n), PM2(n), \ldots, PMm''(n)\}$ is transformed to $\{\hat{PM1}(n), \hat{PM2}(n), \ldots, \hat{PMm}''(n)\}$, in case some estimations or calculations are needed. For some of the vendors, some times may have already changed. For NEs 82-1, 82-2, the times may be the same, but, for NE 82-*n*, the PM includes a "hat" symbol to indicated that this is not original data, but is resulting data after some transformation which will line up all the PM data.

In this sense, the factor of time is considered to be important for synchronizing data. If there is a spike in traffic somewhere in the network, synchronizing data with respect to time allows other spikes in traffic elsewhere in the network to be matched up properly to determine connectivity between ports based on events occurring at the same time. A similar process of correlation and synchronization could be applied to other types of network information, such as state-changes or alarms that represent network events.

From this formatted data, it is then possible to perform a supervised learning process. For supervised learning, a subset of data known to be true can be used for labeling. ML may use a process known as "generalization" to get expected results. Utilizing the data subset, the ML model can be tested by the ML testing unit 66. If testing is successful, the ML model can then be applied to newly obtained data that has not been observed before according to the principle of generalization.

For example, for a given network, an inventory defining the network topology may be stored in the inventory database 40. It may be known that some ports are connected directly while some other ports may be connected indirectly via cross-layer connection. The data subset can be used to train the ML model and then the CLS module 44 can run the ML model across the entire network. According to another aspect of the CLS module 44, if an initial connectivity map is known, it may change over time. In this case, according to generalization over time, historic and newly acquired data can be combined and used for training, such that the ML model, when executed, may still apply to the newer data.

Labelling is a process that may be initiated using the inventory. With a subset of data that is known to include true connectivity information, the data from the inventory can be used to execute the learning processes. Once new data is obtained, the CLS module 44 may be configured to use the unsupervised learning sub-unit 72 for unsupervised learning.

Re-Structuring as ML Input

Figure 5:
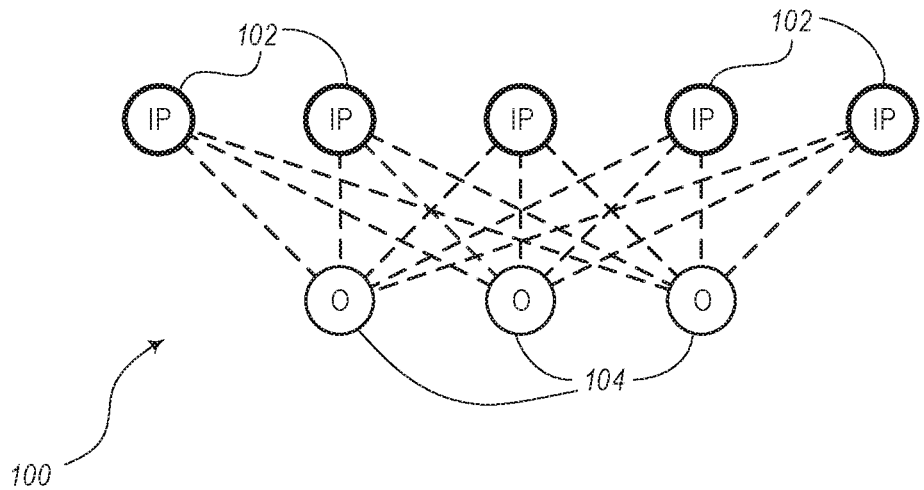
FIG. 5 is a diagram illustrating different possible combinations of cross-layer port-to-port links, according to various embodiments.

The previous data aggregation process 80 obtains the "global view" of a network as stacked time series of snapshots. To make them directly useable for identifying linked port pairs, data re-structure operations are needed, including:
Building node-pair data to traverse all possible IP-Optical port combinations of the observed network, as illustrated in FIG. 5;
Combining data from several time points, so each node-pair can be described with a time-series;
If available, adding connectivity label from inventory as a new column in the previously obtained node-pair time series data.

FIG. 5 is a diagram illustrating an example of different possible combinations of cross-layer port-to-port links 100. In this example, the cross-layer links 100 may be indicative of connectivity between IP ports 102 and optical ports 104. From all the possible combinations of IP-to-optical port-to-port connections, data may be fed into the ML framework, as mentioned above, to determine or discover the probability of the actual presence of each of the links. It should be noted that if the number of combinations of links is too large, additional methodology may be used to improve scalability. For example, the ML framework may be divided into a plurality of procedures. A first procedure, for example, may begin with a small model using only a few features to filter out any possible combinations that have very low probability of actually existing. This can be used to rule out any clearly "non-connections" with limited precision. A second procedure may then be applied for the remaining connection possibilities using a second larger model to determine probability of connections with greater precision. In some embodiments, more than two levels may be used for greater and greater precision.

ML Algorithms Used in CLS

Machine Learning provides a very effective framework to leverage information from the multiple inputs listed above simultaneously and optimally. Depending on the metrics available, the ML models within CLS can be trained in two different approaches.

PM-Based ML

For most cases, the re-structured port PMs may normally be enough to train a useable ML model. Generally, two kinds of ML algorithms could be utilized.

Supervised Learning Algorithms

The supervised learning sub-unit 70 of the CLS module 44 uses the re-structured network metrics (e.g., PM data 90) as "features" inputs of the model-training paradigm. Moreover, the "true" topology information, which can be obtained from the inventory database 40, may be used as the "labels" to verify the performance of the newly learned model with specific cost functions. The verification results are used as feedback to further tune the model's parameter sets until an expected or desired cross-layer topology identification accuracy is reached.

When the number of features of the observed network is not too large, decision tree-based algorithms such as eXtreme Gradient Boosting (XGBoost) or Random Forest can be used as ML for CLS. When the number of features is relatively large, CLS can use a variety of (deep) neural network-based algorithms such as densely connected networks, convolutional networks, recurrent networks, and many others.

The expected output is the probability that two ports are connected (e.g., the output of SciKitLearn method predict_proba( )). A probability threshold (e.g., greater than 99%) can be used as a verification that a connection is true. This probability threshold may be adjusted by a network operator or automatically to define what is viewed as an actual "connection."

Unsupervised Learning Algorithms

On the other hand, the unsupervised learning sub-unit 72 of the CLS module 44 can also be used to determine when true topology information is unavailable, which might happen when the inventory database 40 is outdated or due to the existence of legacy equipment. Without prior inventory information, the unsupervised learning sub-unit 72 may perform unsupervised learning. The unsupervised learning may be dependent on the statistic characteristics of the observed performance metrics. Some possible options may include:

Likelihood Product-based Learning—In a connected network, the performance metrics, (e.g., the traffic-related metrics) will demonstrate similar patterns when two ports are connected with each other. For example, the starting and ending ports of a traffic flow will demonstrate similar or even identical increasing and decreasing changes compared to a baseline.

Pearson Correlation—Similar to the likelihood measurement, observing features of a port changing may be dependent on the transmitting port's characteristic (and also the characteristics of the link therebetween). The potential dependency revealed from the re-structured performance metrics can be evaluated by the Pearson Correlation coefficient, which can be further used to conduct CLS.

Based on the re-structured performance metrics, it is also possible to classify port pairs into two different cluster: connected or not connected. To archive this factor, different clustering algorithms can be applied, either directly on the raw data or together with specific feature engineering methods.

This pattern-matching approach is particularly precise when traffic PM is changing rapidly, for both supervised and unsupervised ML approaches. This can happen when new routes are created or when unusual traffic bursts happen, which may not happen often but may be likely to happen if port statistics are collected for a substantially long time.

Furthermore, it is possible to add active measurements by sending jolts of additional traffic following a special pattern and see where the PMs at the lower layer follow the same pattern.

Additional-Information-Assisted ML

When the port performance data is not sufficient, or the "precision-recall" of the ML model trained by port PMs is not good enough, the additional information (e.g., input data described above) can also be used as a supplement. Although the model training with additional information can still use the above-mentioned supervise/unsupervised learning algorithms, multiple extra operations can be done for extracting new information from the additional data, including, for example:

Using ML to determine which interfaces have the same signature. In some cases, this alone may not be enough to determine if interfaces are directly connected. For example, ports in an L2 switch may have the same signature if they are carrying the same VLAN traffic. However, in other cases, this may still help in reducing the size of experimenting space.

Using ML to study the patterns of alarms, state changes, or other such data where the same events would be observed on connected ports. Based on the amount of data that could be observed, it be possible to increase the probability of the connection.

It is also possible to perform some active step, such as modifying a port's characteristics or changing its state and observing how other ports react to it. For example, this could be performed during a maintenance window if the targeted network is in production.

Estimating Precision and Recall of Stitching

The performance of the CLS module 44 may be verified with labelled data from known inventory according to the ML algorithms described above. Again, it may not be necessary that the full inventory has zero mistakes, only that a clean subset can be sufficient to benchmark the accuracy of the CLS algorithm.

In terms of measuring, the commonly used precision-recall curve may be used in some embodiments. More specifically, the "precision" is the percentage of true port-to-port links among all the links identified by the CLS module 44 on the network 46. The precision may be determined as "true positives vs. (true positive+false positive)." The "recall" is the percentage of true port-to-port links among all the actual port-to-port links in the network 46 and may be determined as "true positives vs. (true positive+false negative)."

Algorithm Optimization

Several techniques or algorithms are described above with respect to the ML algorithms used in CLS. The choice of an optimal or preferred algorithm, based on certain factors, may depend on two criteria:

best precision and recall; and/or best generalization from training data to other network elements and/or other time periods.

This choice may depend on the amount of labeled data available. With minimal statistics, for instance, labels may only be used for testing, but not for training. In this case, the unsupervised learning sub-unit 72 may be used. With more statistics, it is possible to use the supervised learning sub-unit 70 for ML, starting with algorithms of a decision tree family. With even more statistics available, the ML module 60 of the CLS module 44 may include and utilize deep neural networks. As a rule of thumb, deep neural networks typically provide better results with respect precision/recall and generalization, followed by ML using decision trees, while unsupervised ML typically provides the least favorable results with respect to precision/recall and generalization.

Optionally, a two-step ML inference process may be used by applying brute force through every combination, which might be difficult if the network is large. Since the ML model does not need to run in real time with respect to data traffic within the network, it usually does not matter if the inventory analysis takes a long time, particularly if the cross-layer connectivity discovery is only run once in a while. However, even if the training process takes several hours, it typically will not matter since a newly created inventory can easily keep up with changes in the network.

If connections are not initially visible, the systems and methods of the present disclosure may perform a first pass where a small, yet fast ML model may only consider a relatively small number of inputs, which may provide fast but less precise results. Thus, the present systems can filter out connection possibilities that are clearly unlikely. In this sense, it may be possible to filter out a large number of possible connection (e.g., about 90% of the possibilities).

Then, for the remaining possible connections (e.g., the remaining 10%), the present systems can use a larger model, which might be more precise, but may be slower and more expensive to implement. This second model may be used only for a subset of the data that needs more precision.

Integration of CLS with Other Software Products

Figure 6A:
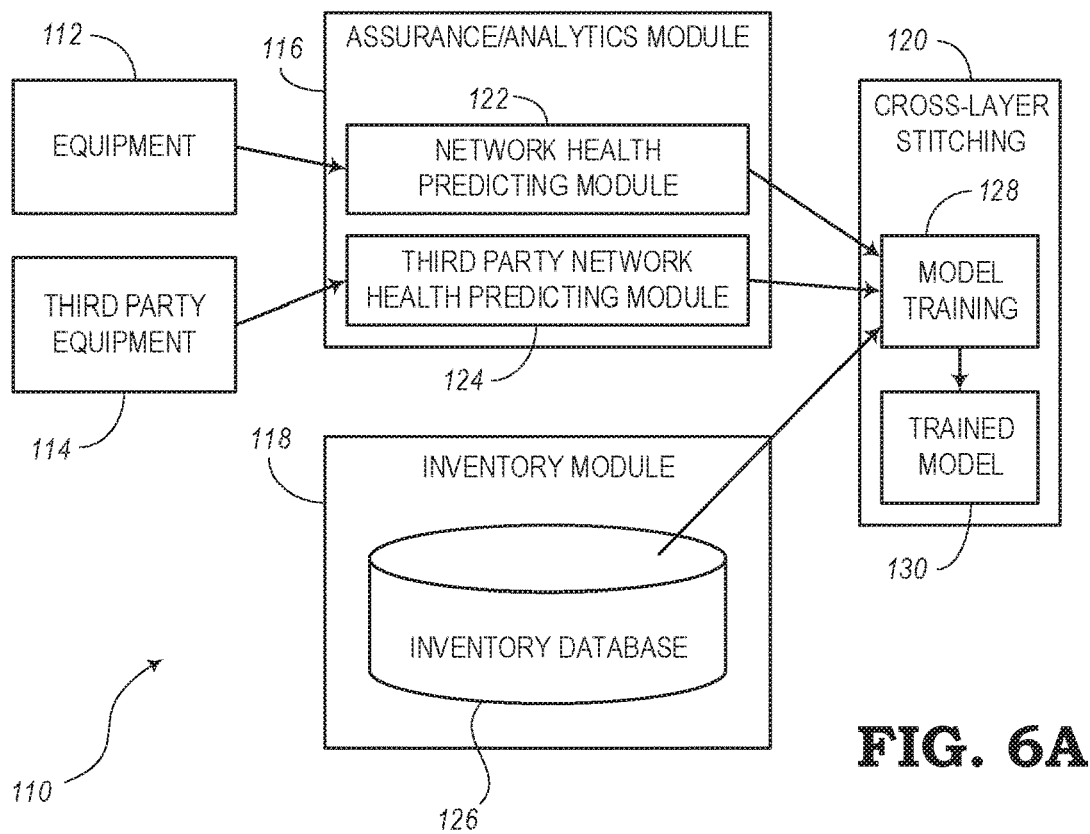
FIG. 6A is a flow diagram illustrating the data flow among hardware equipment and software modules during a model training process, according to various embodiments.

FIG. 6A is a block diagram illustrating an embodiment of a system 110 of network and software components, and more particularly shows the data flow among hardware equipment and software modules of the system during a model training process. The system 110 includes network equipment 112 of a network under observation, third party network equipment 114, an assurance/analytics module 116, an inventory module 118, and a CLS program 120, which may be related to the CLS module 44. The assurance/analytics module 116 may include a network health predicting module 122 for analyzing the health of the equipment 112 and a third party network health predicting module 124 for analyzing the health of the third party equipment 114. The inventory module 118 may include an inventory database 126. Also, the CLS program 120 may include a model training module 128 and a trained model 130.

The CLS program 120 may be designed to work together with other existing software products. For example, as shown in FIG. 6A, the CLS program 120 may be configured to provide results that are fed to other software components for further processing of operations, management, control, and maintenance processes of a Network Management System (NMS), Network Operations Center (NOC), or other similar control entity.

To train a CLS ML model for a specific network from scratch, the network health predicting module 122 of the assurance/analytics module 116 may be used to retrieve historical PMs from a vendor's own equipment 112, while the third party network health predicting module 124 may be used to obtain other vendor's data from the third party equipment 114. The data obtained from the equipment 112, 114 by the assurance/analytics module 116 may be provided to the model training module 128 of the CLS program 120. Also, the true topology of the observed network can be extracted from the inventory database 126 of the inventory module 118 and provided to the model training module 128. The model training module 128 may be configured for supervised ML, when possible, or otherwise may execute an unsupervised ML technique. Once the ML model is successfully trained in the model training module 128, the model may be stored as the trained model 130.

Figure 6B:
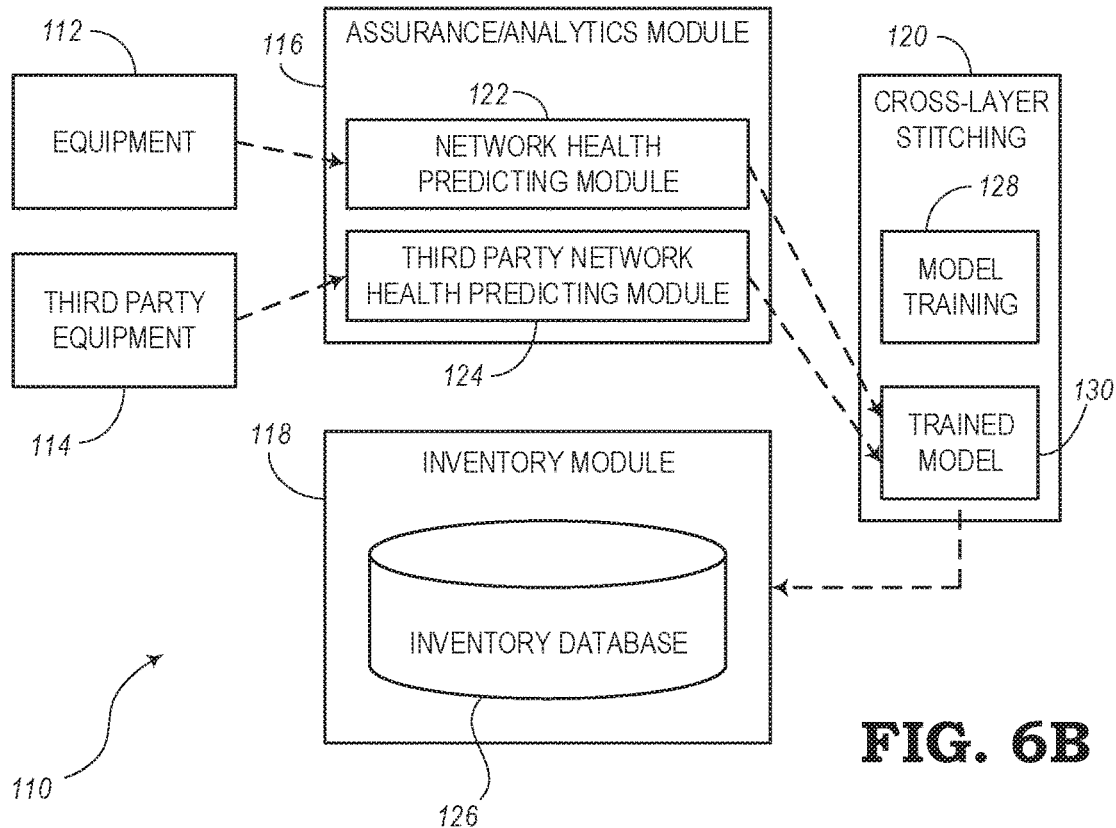
FIG. 6B is a flow diagram illustrating the data flow among the hardware equipment and software modules shown in FIG. 6A during a live network inference process, according to various embodiments.

FIG. 6B is a block diagram of the system 110 of FIG. 6A and shows the data flow among the hardware equipment and software modules of the system 110, according to one embodiment, during a live network inference process (e.g., after the ML model is trained). The live data obtained from equipment 112, 114 is provided from the network health predicting module 122 and third party network health predicting module 124 to the trained model 130. This data is used as the inputs to the trained model 130, which is configured to perform a procedure for discovering the cross-layer stitched topology. The cross-layer connectivity results can be provided to the inventory database 126 to allow the inventory module 118 to verify or update the inventory database 126. The live inference process of FIG. 6B can be done proactively in a periodic pattern or passively triggered by specific events.

Moreover, the topology information can be further used in other software components (e.g., for performing route origin authorization functions or other management or control functions). Also, this may allow these other software components to make more efficient route optimizations on the fly and provide other benefits.

The functions of FIGS. 6A and 6B can be repeated continuously. For example, the processes described with respect to FIG. 6A may be performed again (after updating the inventory database 126) to further train the ML model based on updated cross-layer topology information in the inventory database 126. Then, the function of FIG. 6B may then be performed again to process newly obtained input data by using the updated ML model.

The inventory database 126 may be configured as a "positive" inventory. If a network operator is assigned to manage a large network, for example, the operator may allow the system 110 to operate to perform data acquisition for different, disjoint networks. Once a data-driven stitching discovery process is in place, the system 110 can use the ML model to populate the inventory in the inventory database 126. The results can also be used to verify if there are any mistakes in the inventory database (e.g., based on changes to the networks) and make any necessary changes to the inventory to correct the mistakes.

After the trained model 130 is obtained, the system 110 may use supervised learning to perform the operation continuously or on a regular periodic schedule. The system 110 can operate in a live network scenario or within a maintenance window. In the maintenance window, the network equipment 112 may be in operation during a time when it is possible to alter one or more settings or characteristics of the network to actively change the network. Then, from these forced changes, it is possible to observe how each of the NEs reacts. The reaction of various nodes or ports can be used to determine connectivity information.

Further Embodiments Beyond IP-Optical Cross-Layer

While IP-optical cross-layer stitching is of prime interest because of its business case, it is also possible to use a very similar approach for intra-layer stitching (aka topology discovery). For instance, it could be possible to discover circuits of OCLD cards at layer-1 or chained of Amplifiers at layer-0, based on time correlations of PMs and Alarms. For instance:
  OTM ports raising Alarms "Laser Frequency Out of Range" or "Far End Client Signal Fail" at similar raise time with similar duration are likely to be inter-connected.
  OSC ports with matching PM values for Optical Power Receive, Optical Power Transmit and Span Loss are likely to be inter-connected This pattern-matching approach, which may be performed by the data-pattern matching unit 62, is particularly precise when PMs change rapidly. For instance, PM "jumps" are observed when new wavelengths (channels) are provisioned at the optical layer and when new routes (e.g., vLANs, tunnels, etc.) are being created at the Ethernet or IP layers.

Therefore, the present disclosure is directed to cross-layer topology discovery using an ML framework to discover connected ports in a communication network from a multivariate time-series analysis without relying on networking protocols. To summarize, the present disclosure provides various embodiments, including, among things:
  Data Inputs
    features:
      numerical PMs of Ethernet ports
      Alarms "string" like interface names or inventory items state changes labels: inventory information in a controlled environment Two-steps process to synchronize data from different sources and assemble time windows of ports data in pairs.

Pre-processing methods to combine imperfect "string" data such as interface names with numerical information such as Ethernet PMs.

Optional two-steps ML inference process:

first using a small & fast model to reduce number of port-to-port combinations then using a larger model to get maximal precision Using inputs, executing supervised or unsupervised ML algorithms, providing:

binary classification results (connected or not connected) of each IP-optical port pair;

probability of being connected of each IP-optical port pair;

adjustable threshold on connection probability;

ability to benchmark precision and recall of ports' stitching for any probability threshold.

Option to actively induce special traffic patterns or alter physical characteristics of the ports (e.g., during maintenance window) to maximize precision of the pattern recognition algorithms Application of the above to IP-over-optical (cross-layer) stitching Application of the above to stitching in an Optical Transport Network (OTN), e.g., identify paired ports of Optical Channel Laser Detector (OCLD) cards, to identify chained amplifiers along an Optical Transport Unit (OUT)

Application of the above to populate inventory database of NMS from scratch

Application of the above to fix mistakes in pre-populated inventory database of NMS The cross-layer topology discovery systems and methods of the present disclosure may include embodiments to actively induce events that can be detected by related ports. The operations may work as a passive observer, which allows the network to perform normally without interruption. The data acquisition components do not interfere with the NEs, but instead observe the activities of the network to obtain the data inputs to infer how the ports are connected. In some embodiments, the network operator may select an option to actively induce some specific traffic pattern, such as by turning a portion of the network off within a maintenance window. For example, by intentionally turning off a port, it is then possible to see what other NEs are affected and from which elements alarms are received.

Figure 7:
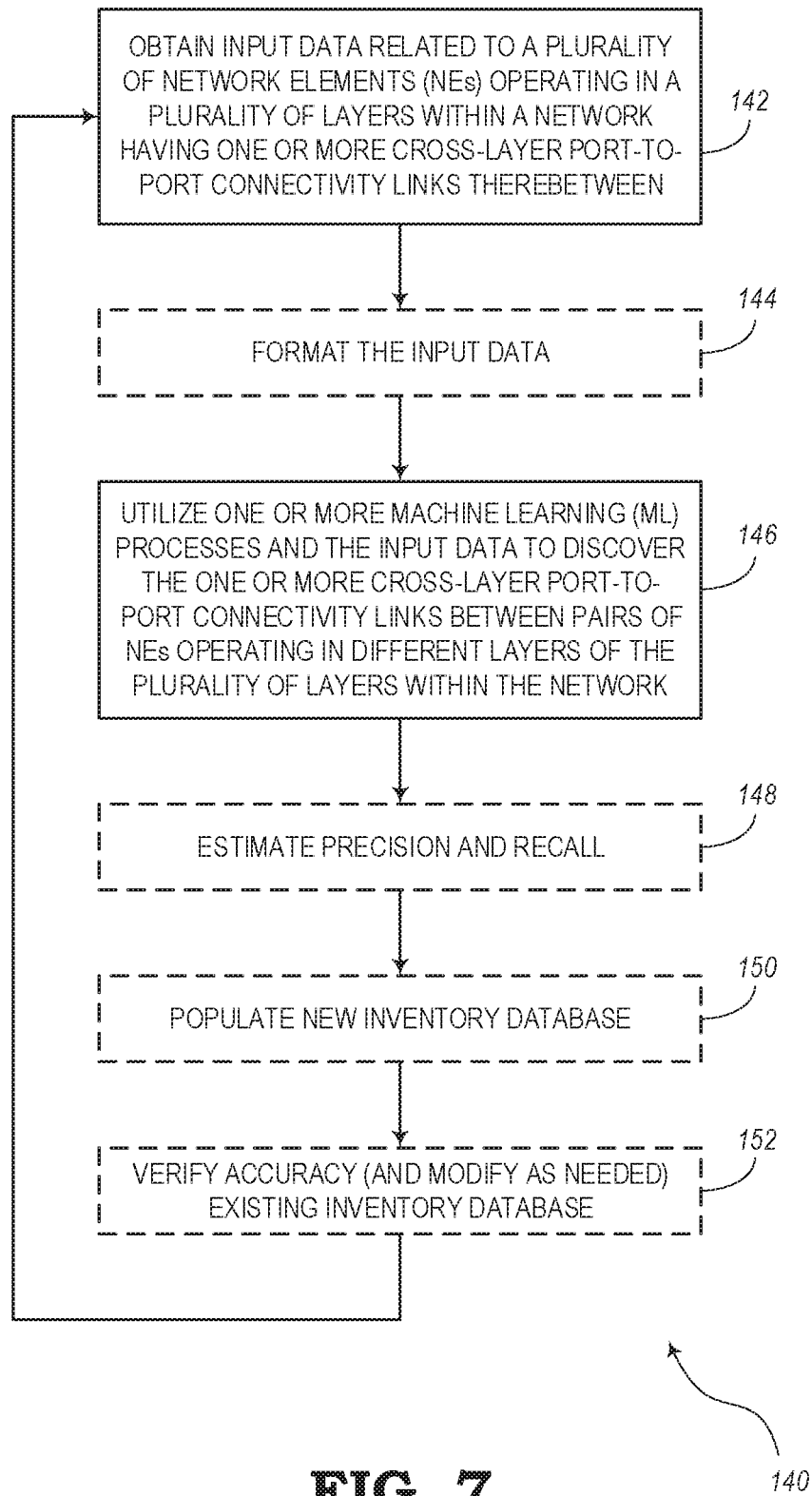
FIG. 7 is a flow diagram illustrating a process of the cross-layer stitching module of FIG. 3, according to various embodiments.

FIG. 7 is a flow diagram illustrating an embodiment of a process 140 for performing a discovery of link topology of cross-layer connectivity within a network. In some embodiments, the process 140 may be executed by the cross-layer stitching module 44 of FIG. 3 (or the CLS program 120 of FIGS. 6A and 6B). The process 140 includes obtaining input data related to a plurality of Network Elements (NEs) operating in a plurality of layers within a network having one or more cross-layer port-to-port connectivity links therebetween (e.g., a multi-layer network), as indicated in block 142. The input data may then be formatted, as indicated in block 144. The process 140 further includes the step of utilizing one or more Machine Learning (ML) processes and the input data to discover the one or more cross-layer port-to-port connectivity links between pairs of NEs operating in different layers of the plurality of layers within the network, as indicated in block 146. Block 146 may include utilizing the formatted input data to discover cross-layer port-to-port connectivity topology between multiple pairs of NEs operating in different layers within the multi-layer network.

In some embodiments, the formatting step (block 144) may include the step of formatting the input data by performing a data aggregation process. The data aggregation process may include one or more of data synchronization and data concatenation processes. Also, block 146 of the process 140 may include discovering the one or more cross-layer port-to-port connectivity links by using a data-pattern matching process.

Furthermore, the process 140 may include the step of estimating precision and recall information based on results from the ML processes, as indicated in block 148. Also, the process 140 may be configured to perform one or more steps of reconciling an inventory database. The steps of reconciling the inventory database may include one or more of 1) populating a new inventory in the inventory database and 2) verifying the accuracy of an existing inventory in the inventory database and modifying the existing inventory based on the verifying.

The ML processes described in block 146 may include training a ML model using inventory data from a controlled environment where port-to-port connectivity information of the inventory data is known to be correct. Training the ML model may also include labelling training and testing data from which the ML model is derived. The controlled environment, for example, may be a lab, a reference production network, or a subset of the network. The process 140 may work independently of the particular network protocol associated with each respective layer of the multi-layer network. The different layers may include an optical layer overlaid by an Internet Protocol (IP) layer. Also, the input data may include multi-variate time-series Performance Metrics (PMs).

In some embodiments, the process 140 may further comprise the step of estimating precision and recall information from the results of the cross-layer connectivity discovery. Also, the process 140 may include populating a new inventory database, as indicated in block 150, and verifying the accuracy of an existing inventory database and modifying this database as needed, as indicated in block 152. The process 140 may also include the steps of 1) modifying one or more ports of the one or more NEs during a maintenance window, wherein modifying the one or more ports includes one of: a) inducing a specific traffic pattern, b) altering physical characteristics of the one or more ports, and c) turning off the one or more ports, 2) observing an effect on other NEs, and 3) tuning a pattern recognition process of the one or more ML processes to improve the precision of the pattern recognition process.

The CLS systems, methods, and modules described herein may be containerized as a software component under a broader spectrum of a general platform architecture in order that the cross-layer stitching results can be widely used by the other software components of the general platform architecture.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Network Management System (NMS) comprising
a processing device, and
a memory device configured to store instructions that, when executed, cause the processing device to
obtain input data related to a plurality of Network Elements (NEs) operating in a plurality of layers within a network having a cross-layer topology of one or more cross-layer port-to-port connectivity links therebetween, and
utilize a Machine Learning (ML) model and the input data to discover the cross-layer topology including the one or more cross-layer port-to-port connectivity links between pairs of NEs operating in different layers of the plurality of layers within the network,
wherein the ML model is trained utilizing one or more ML processes with multi-variate time-series data including a known cross-layer topology with known cross-layer port-to-port connectivity links therein.

2. The NMS of claim 1, wherein the instructions, when executed, further cause the processing device to format the input data by performing a data aggregation process, wherein the data aggregation process includes one or more of data synchronization and data concatenation.

3. The NMS of claim 1, wherein the instructions, when executed, further cause the processing device to utilize the ML model to discover connectivity topology between multiple pairs of NEs operating in the different layers within the network using a data-pattern matching process.

4. The NMS of claim 1, wherein the instructions, when executed, further cause the processing device to utilize the ML model to reconcile an inventory database by one of
population of a new inventory in the inventory database, and
verification of accuracy of an existing inventory in the inventory database and modification of the existing inventory based on the verification.

5. A non-transitory computer-readable medium configured to store computer logic having instructions that, when executed, cause one or more processing devices to
obtain input data related to a plurality of Network Elements (NEs) operating in a plurality of layers within a network having a cross-layer topology of one or more cross-layer port-to-port connectivity links therebetween, and
utilize a Machine Learning (ML) model and the input data to discover the cross-layer topology including the one or more cross-layer port-to-port connectivity links between pairs of NEs operating in different layers of the plurality of layers within the network,
wherein the ML model is trained utilizing one or more ML processes with multi-variate time-series data including a known cross-layer topology with known cross-layer port-to-port connectivity links therein.

6. The non-transitory computer-readable medium of claim 5, wherein the instructions, when executed, cause the one or more processing devices to
train the ML model using inventory data from a controlled environment where port-to-port connectivity information of the inventory data is known to be correct, and
label training and testing data from which the ML model is derived,
wherein the controlled environment includes one of a lab, a reference production network, and a subset of the network.

7. The non-transitory computer-readable medium of claim 5, wherein the instructions, when executed, cause the one or more processing devices to estimate precision and recall information based on results from utilizing the ML model.

8. The non-transitory computer-readable medium of claim 5, wherein the different layers include an optical layer overlaid by an Internet Protocol (IP) layer and the input data includes multi-variate time-series Performance Metrics (PM) of the plurality of NEs.

9. A method comprising the steps of
obtaining input data related to a plurality of Network Elements (NEs) operating in a plurality of layers within a network having a cross-layer topology of or more cross-layer port-to-port connectivity links therebetween, and
utilizing a Machine Learning (ML) model and the input data to discover the cross-layer topology including the one or more cross-layer port-to-port connectivity links between pairs of NEs operating in different layers of the plurality of layers within the network,
wherein the ML model is trained utilizing one or more ML processes with multi-variate time-series data including a known cross-layer topology with known cross-layer port-to-port connectivity links therein.

10. The method of claim 9, further comprising the step of utilizing the ML model to discover connectivity topology between multiple pairs of NEs operating in the different layers within the network.

11. The method of claim 9, further comprising the step of formatting the input data by performing a data aggregation process.

12. The method of claim 11, wherein the data aggregation process includes one or more of data synchronization and data concatenation.

13. The method of claim 9, wherein discovering the one or more cross-layer port-to-port connectivity links includes a data-pattern matching process.

14. The method of claim 9, further comprising the step of reconciling an inventory database.

15. The method of claim 14, wherein the step of reconciling the inventory database includes one of
populating a new inventory in the inventory database, and
verifying accuracy of an existing inventory in the inventory database and modifying the existing inventory based on the verifying.

16. The method of claim 9, wherein the one or more ML processes include:
training the ML model using inventory data from a controlled environment where port-to-port connectivity information of the inventory data is known to be correct, and
labelling training and testing data from which the ML model is derived,
wherein the controlled environment includes one of a lab, a reference production network, and a subset of the network.

17. The method of claim 9, further comprising the step of estimating precision and recall information based on results from utilizing the ML model.

18. The method of claim 9, wherein the different layers include an optical layer overlaid by an Internet Protocol (IP) layer, and wherein the method is performed independently of network protocols associated with the optical layer and IP layer.

19. The method of claim 9, wherein the input data includes multi-variate time-series Performance Metrics (PMs) of the plurality of NEs.

20. The method of claim 9, further comprising the steps of
- modifying one or more ports of the one or more NEs during a maintenance window, wherein modifying the one or more ports includes one of:
  - inducing a specific traffic pattern,
  - altering physical characteristics of the one or more ports, and
  - turning off the one or more ports,
- observing an effect on other NEs, and
- tuning a pattern recognition process of the ML model to improve the precision of the pattern recognition process.

* * * * *